G. B. SMITH.
MACHINE FOR ASSEMBLING BED FABRIC CHAINS.
APPLICATION FILED JULY 29, 1915. RENEWED NOV. 2, 1916.

1,228,491.

Patented June 5, 1917.
3 SHEETS—SHEET 2.

Witnesses
JP Tomlin
R L Parker

Gary B. Smith Inventor
by C A Snow & Co.
Attorneys

UNITED STATES PATENT OFFICE.

GARY B. SMITH, OF CHICAGO, ILLINOIS.

MACHINE FOR ASSEMBLING BED-FABRIC CHAINS.

1,228,491. Specification of Letters Patent. Patented June 5, 1917.

Application filed July 29, 1915, Serial No. 42,518. Renewed November 2, 1916. Serial No. 129,229.

*To all whom it may concern:*

Be it known that I, GARY B. SMITH, a citizen of the United States, residing at Chicago, in the county of Cook and State of Illinois, have invented a new and useful Machine for Assembling Bed-Fabric Chains, of which the following is a specification.

The present invention relates to a machine for assembling the chains which go to make up a bed-spring fabric, and aims to provide a novel and improved apparatus for assembling longitudinal and cross chains, the present invention being an improvement over the assembling machine disclosed in my co-pending application Serial No. 42,517 filed even date herewith.

It is the object of the invention to provide a chain fabric assembling machine of the general nature of the machine disclosed in said co-pending application, and embodying certain improved features to enhance the utility and efficiency of the machine, the machine in the present case being entirely automatic in operation so that the attention of the operator is only necessary in case that the machine gets out of order.

The improved assembling machine embodies in its essentials, a mechanism for delivering or feeding a continuous chain into the longitudinal passage of a guide across a number of cross chains extending through the guide and having hooks for receiving the continuous chain, and a contrivance set in motion when a predetermined length of continuous chain is received by the guide, for severing the continuous chain to provide a longitudinal chain within the guide for assemblage with the cross chains, then clenching or bending the hooks of the cross chains to embrace the longitudinal chain, then feeding the cross chains to one side to remove the last longitudinal chain from the guide and to arrange the cross chains for receiving the succeeding longitudinal chain, and finally returning the various devices to normal or original position for a new operation.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

The present assembling machine is of the same general construction as the assembling machine disclosed in said patent so that the description of the present machine may be abbreviated accordingly, reference being had to said patent for the features covered specifically thereby and only referred to generally in the present application. The present machine, the same as the assembling machine disclosed in said patent, is adapted especially for use in conjunction with the machine for making bed fabric disclosed in said patent, but the machine may be taken as typical of any suitable chain delivering or feeding mechanism.

The machine M, the operation of which will be clear by reference to said patent, embodies a table or bed 1 upon which is mounted for reciprocation a wire feeding grip 2 controlled by a trip 3. The trip 3 is rendered inoperative by an arm 4 connected to a crank arm 5. The machine M also embodies a reciprocatory dog 6 for delivering or feeding the completed chain 7' therefrom. The dog 6 is rendered inoperative by a wedge 28 adapted to be moved under the same to prevent the dog 6 from engaging the continuous chain 7', and the wedge 28 is connected by a link or rod 26 with the crank arm 5. The crank arm 5 is connected to a hand lever 27 which when swung properly, will swing the arm 4 and slide the wedge 28 to render the grip 2 and dog 6 inoperative when desired, as well as the feeding rolls of the machine M. Naturally, when the grip 2 and dog 6 are rendered inoperative, the feeding of the wire and continuous chain is arrested.

Figure 1:
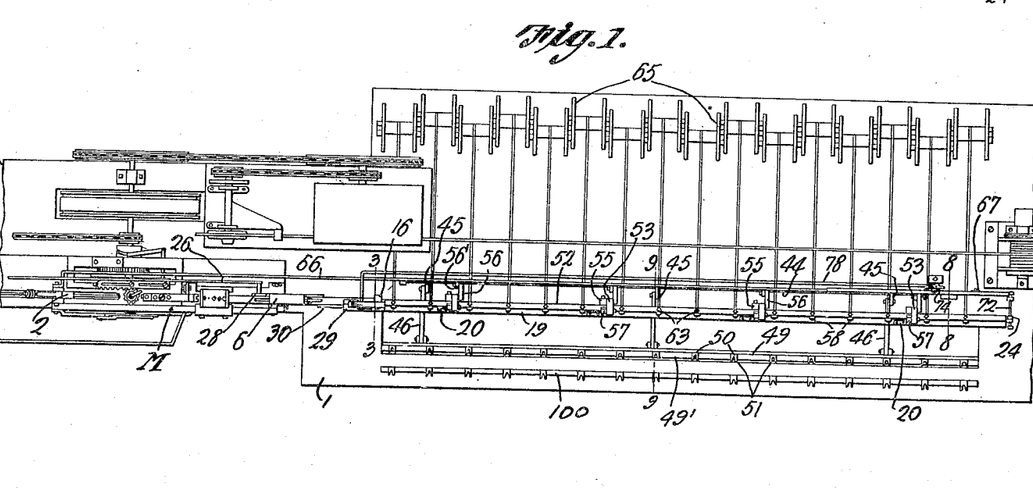
Figure 1 is a plan view of the assembling machine combined with the bed-fabric making machine disclosed in my Patent No. 1,153,266, granted September 14, 1915, portions being broken away.
Figure 2:
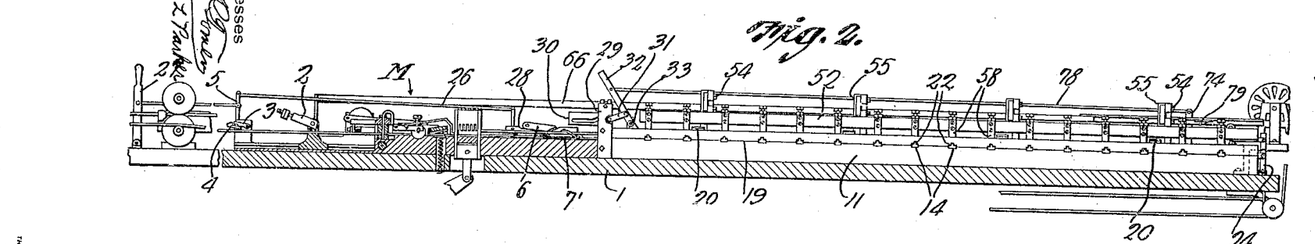
Fig. 2 is a view of the parts illustrated in Fig. 1, showing parts in elevation and other parts in longitudinal section, while other portions are broken away.
Figures 3, 4, 5, 6, 7:
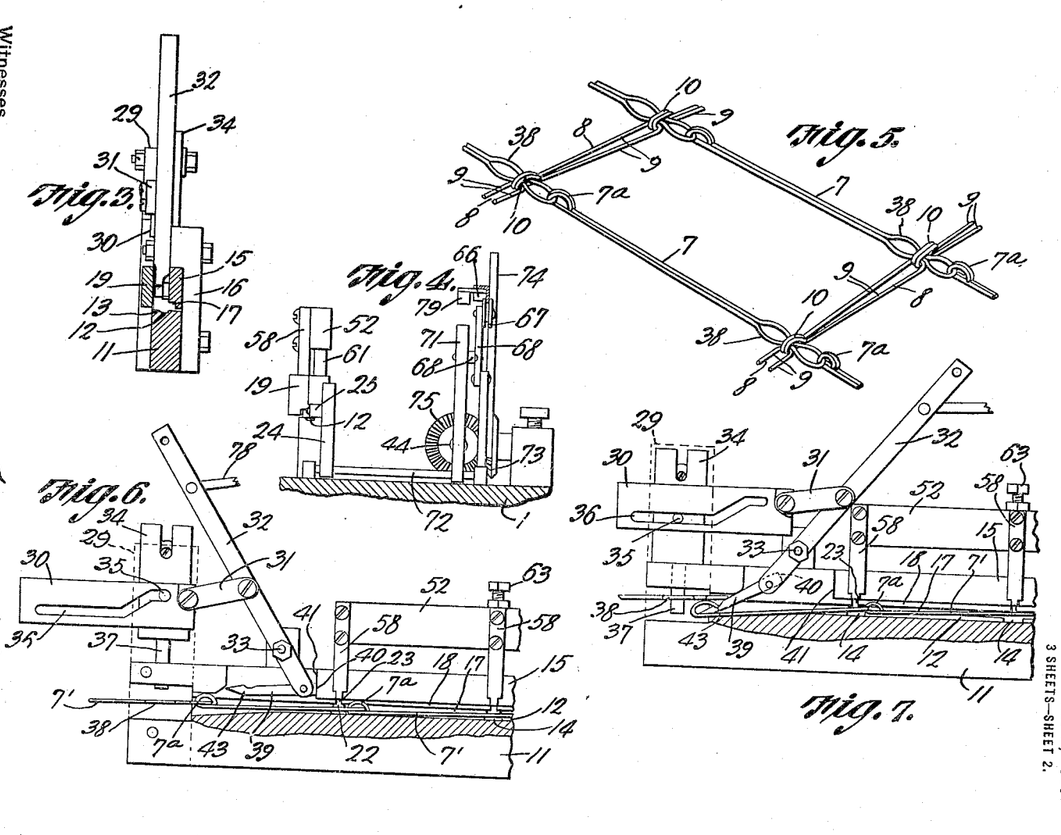
Fig. 3 is an enlarged cross-sectional detail taken on the line 3—3 of Fig. 1 and illustrating the chain severing device.
Fig. 4 is an enlarged elevation of the automatic mechanism for operating the severing device, clenching means and cross-chain feeding means.
Fig. 5 is a fragmental perspective view of the fabric illustrating one longitudinal chain embraced by the respective hooks of the cross chains, and illustrating another longitudinal chain disposed within the respective open hooks of the cross chains.
Fig. 6 is an enlarged elevation of the severing device in normal or inoperative position.
Fig. 7 is a view similar to Fig. 6 illustrating the severing device in the act of severing the continuous chain.

Reference is had to the construction of the fabric as illustrated in Fig. 5, before the assembling machine is taken up in detail in order that the operation may be more clearly understood. The fabric embodies longitudinal chains 7 whose links are hooked together, as at 7ª, and these longitudinal chains are assembled with a number of cross chains 8 each embodying doubled wire links 9 having their terminals bent back into hooks 10 engaging the bends of the adjacent or companion links and also embracing the respective links of the longitudinal chains 7, as disclosed in my Patent No. 1,149,793 issued August 10, 1915. The hooks 10 of the cross chains are open prior to the assemblage of the longitudinal chains therewith, while in the completed fabric, the hooks are bent or clenched against the body portions of the links 9 to embrace and securely fasten the longitudinal chains to the cross chains. The machine for assembling the longitudinal chains with the cross chains is constructed and operates the same, in its general aspects, as the assembling machine disclosed in my co-pending application Serial No. 42,517, but there are a number of improved features, notably the automatic operation of the various devices constituting the machine.

The present assembling machine is carried by the table or base 1 upon which the chain making machine M is mounted, and embodies a longitudinal bar 11 secured rigidly upon the table or support 1 in alinement with the machine M to receive the continuous chain 7' thereon, the bar 11 also serving as an anvil upon which the hooks of the cross chains are bent or clenched to embrace the longitudinal chain. This bar 11 has an upper longitudinal groove 12 for receiving the bends of the hooks 7ª of the continuous chain 7' when the continuous chain is fed over the bar 11, and one side wall of the groove 12 is inclined, as at 13, to permit of the ready movement of the cross chain links, and the longitudinal chain off of the bar 11. The upper edge of the bar 11 is also provided with a longitudinal series of suitably spaced transverse grooves or channels 14 intersecting the groove or channel 12, and the grooves 14 are for the passage and guidance of the cross chains 8 over the bar 11.

A second longitudinal bar 15 is disposed immediately above one side portion of the stationary bar 11, and is rigidly attached to said bar 11 by means of stays or members 16 bolted or otherwise attached to the bars 11 and 15 at one side thereof. The bars 11 and 15 are horizontal and parallel, and are spaced slightly apart. The lower edge of the bar 15 has a longitudinal rabbet 17 for the passage of the longitudinal chain 7, and to guide said longitudinal chain for proper longitudinal movement upon the bar 11. The bar 15 also has a secondary longitudinal rabbet 18 adjacent the rabbet 17 for receiving the upper portions of the hooks 7ª of the longitudinal chain links. The rabbet 18 is disposed above the groove or channel 12.

A third bar 19 is disposed at one side of and normally bears against the bar 15 above the respective side portion of the bar 11, and the upper edge of the bar 19 is connected by hinges 20 with the upper edge of the bar 15, whereby the bar 19 is hung or suspended at one side of the bar 15 for movement away from said bar 15 when necessary. The lower or free edge of the bar 19 has a longitudinal rabbet 21 coöperating with the rabbet 17 of the bar 15 for receiving and guiding the longitudinal chain 7 upon the bar 11. The coöperating bars 11, 15 and 19 are thus provided with a suitable longitudinal passage therebetween for the proper guidance of the longitudinal chain for longitudinal movement into the assembling machine without danger of the links of the longitudinal chain being displaced out of alinement.

The lower edges of the bars 15 and 19 are provided with complementing or alining notches or recesses 22 above and coöperating with the transverse grooves or channels 14 of the bar 11, whereby the cross chains will pass properly through the grooves 14 and notches 22. The notches 22 have supplemental notches 23 for the passage of the hooks 10 of the cross chains 8, and the cross chains are thus guided for proper movement across the bar 11. The bar 11 forming a part of the guide for the longitudinal chain is fixed upon the table and normally alines with the machine M to receive the continuous chain 7'.

The device for setting in motion the automatic mechanism, embodies a lever 24 fulcrumed or pivoted upon the table 1 at the tail end of the bar 11 remote from the machine M, and a plunger 25 is pivoted to the lever 24 and projects slidably into the longitudinal passage of the guide provided by the bars 11, 15 and 19. This plunger 25 may be of any length, or can be replaced by plungers of different lengths, so that when a predetermined length of chain is received by the longitudinal passage of the guide, the chain will abut against the plunger 25 and force the said plunger outwardly or rearwardly for swinging the lever 24 to bring the mechanism into operation for severing the continuous chain 7' to provide a longitudinal chain 7 which is then assembled with the cross chains. If a longer plunger 25 is used, a shorter longitudinal chain is provided, since a shorter length of the continuous chain is only allowed to enter the guide before the plunger 25 is reached, and if a short plunger 25 is used, a greater length of continuous chain is allowed to enter the guide. In this manner, various lengths of fabric may be constructed with the same assembling machine, the number of cross chains being varied accordingly. The manner in which the movement of the lever 24 is utilized for setting the respective devices or mechanisms into operation will be taken up in detail hereinafter.

The device for severing the continuous chain 7' at the receiving end of the assembling machine is illustrated in Figs. 3, 6 and 7, and embodies a standard 29 carried by that end of the bar 11 adjacent the machine M, and a longitudinally slidable cam member or slide 30 is carried by the standard 29 above the bar 11. One end of the slide 30 is connected by a link 31 to a lever 32 fulcrumed, as at 33, upon the bar 15, and a vertically slidable plunger 34 is also carried by the standard 29 adjacent the slide 30, and is provided with an outstanding lug or pin 35 working in a cam slot 36 provided in the slide 30, whereby when the slide 30 is reciprocated, the plunger 34 will be reciprocated vertically. The plunger 34 has a lower depending finger 37 to pass or project tightly through the loop 38 of the respective underlying link of the continuous chain 7', whereby the said link will stick to and be held by the finger 37. The finger 37 passes slidably through the bar 15, and the plunger 34 is normally raised so as to retract the finger 37 out of the path of the chain or the longitudinal chain passage. A chisel or wedge 39 is pivoted to the lower end or arm of the lever 32, and is provided with a square or blunt butt end 40 normally seating against a shoulder 41 of the bar 15 in which the chisel 39 is disposed. The chisel 39 has an upper notch or shoulder 43 adjacent its sharp end. When the lever 32 is swung to the position illustrated in Fig. 6, the slide 30 is moved to raise the plunger 34, and the butt end of the chisel 39 is brought against the shoulder 41, thereby raising the sharp end of the chisel out of the path of the chain or the longitudinal chain passage.

The operation of the severing mechanism is as follows: When the desired length of the continuous chain 7' is delivered into the assembling machine, so that the plunger 25 is reached, that is, with the end of the continuous chain abutting against the plunger to move the plunger outwardly, the automatic mechanism hereinafter described is set in motion for swinging the lever 32. When the lever 32 is swung from its normal position, as seen in Fig. 6, to the position illustrated in Fig. 7, the slide 30 is pulled with the lever 32, causing the plunger 34 to be forced downwardly, thereby thrusting or projecting the finger 37 through the loop 38 of the underlying link of the continuous chain 7', to hold said link stationary. When the lever 32 is swung as indicated, the chisel 39 is moved forwardly by the lever, and the butt end of the chisel 39 leaves the shoulder 41. This allows the free end of the chisel 39 to drop onto the underlying link adjacent the link held by the finger 37, and the free or sharp end of the chisel 39 is slid and forced under the hook $7^a$ of the respective chain link, thereby unbending or raising said hook so as to open the same. When the stroke of the lever 32 is completed, the said hook $7^a$ is moved backwardly out of engagement from the link held by the finger 37, and said hook $7^a$ will snap or spring into the notch 43 of the chisel 39, so that the hook will be frictionally held by the chisel. Then when the lever 32 is swung back to normal position, the longitudinal chain 7 within the guide which is provided by the severing of the continuous chain 7', is moved back to position within the guide, since the end link of the chain 7 which sticks to the chisel 39 will cause the chain 7 to move to position when the chisel 39 is being retracted. The chain 7 is returned to position in abutment with the plunger 25 before the chisel 39 is returned completely to normal position, and this results in the chisel 39 being withdrawn from the respective hook $7^a$ when the chisel is brought back to normal position, in which event the chisel is raised off of the chain by the abutment of the butt end of the chisel against the shoulder 41. At the same time, the plunger 34 is raised to retract the finger 37 and release the new end link of the continuous chain 7'.

The device for feeding or drawing the cross chains 8 across the bar 11 or through the transverse passages of the guide embodies a longitudinal slide 49 slidably carried by the table 1 at one side of the bar 11 and having a longitudinal upstanding flange 49' upon which catches 50 are secured, said catches having bifurcated portions or prongs 51 for the passage of the cross chains. Said prongs are engageable with the longitudinal chains 7. This slide 49 is reciprocated transversely for feeding or pulling the fabric to one side as the longitudinal chains are assembled with the cross chains.

The slide 49 is reciprocated transversely toward and away from the bar 11 by means of a longitudinal rock shaft 44 journaled upon the table 1 at that side of the bar 11 opposite the slide 49, and the rock shaft 44 is provided with a plurality of downwardly projecting arms 45 working within transverse slots 47 provided in the table 1. Links 46 are pivoted to the slide 49 and work within the slots 47, and are provided with slots 46' receiving bolts or other elements 48 carried by the free ends of the arms 45, whereby the arms 45 have limited movements with respect to the links 46, the movement of the elements 48 of the arms 45, however, being greater than the length of the slots 46' so that the links 46 will be reciprocated properly. When the rock shaft 44 is rotated to swing the arms 45 toward the bar 11, the arms 45 push the links 46 ahead of them toward the opposite side of the bar 11 for returning the slide or bar 49 to normal position away from the bar 11, and the catches 50 in engaging the respective longitudinal chain 7 of the fabric will pull the cross chains across the bar 11 to remove the respective longitudinal chain and cross chain links from off of the bar 11, and to bring the succeeding open hooks 10 of the cross chains above the bar 11 within the longitudinal passage of the guide. If need be, suitable means 100 similar to the parts 49'—50 may be provided for preventing a retrograde movement of the fabric, and although this may not ordinarily be necessary, it can be readily supplied by the skilled mechanic. The cross chains 8 pass through the grooves 14 and notches 22, or through the transverse passages of the guide, and the fabric including the cross chains passes over the flange 49', to be delivered to one side by the movement of the flange 49'.

Assembled with the bars 11, 15 and 19 is a device for clenching or bending the hooks of the cross chain links to embrace the longitudinal chain 7 held by the guide. This device embodies a longitudinal horizontal bar 52 mounted slidably above the bar 15, and reciprocated vertically by means of bellcrank levers which have their elbows fulcrumed, as at 54, to standards or posts 55 attached to the bars 11 and 15. The long arms of the levers 53 project downwardly at one side of the bars 11, 15 and 52, and the lower ends of the long arms are connected by links 56 to the downwardly projecting arms 56' attached to the rock shaft 44, so that the clenching or bending means are operated by the same rock shaft 44 that operates the feeding means for the cross chains. The upper short arms of the bellcrank or L-shaped levers 53 project over the bar 52 and are connected by links 57 with said bar. When the rock shaft 44 is rotated to move the slide 49 toward the bar 11, the arms 56' are swung away from the bar 11, thereby pulling the links 56, and swinging the levers 53 to depress the bar 52. When the slide 49 is returned to normal position, the bar 52 is also raised for obvious reasons.

Downwardly projecting plungers 58 are secured to the bar 52, and are slidable through channels or recesses 59 provided in the inner side of the bar 19, whereby the bar 19 can swing without interference. The lower ends of the plungers 58 are formed, as at 60, so as to engage or abut against the bends of the hooks 10 of the links 9 to force said hooks backwardly slightly against the chain 7ª and to prevent the displacement of the hooks when being bent. There is one plunger to each groove 14. Adjacent each plunger 58, the bar 52 carries a downwardly projecting die 61 which has its upper end tightly received by a bore 62 provided in the bar 52, adjusting screws 63 being threaded in the upper ends of the bores 62 for forcing the dies 61 downwardly to the desired position. The lower ends of the dies 61 are bifurcated, as at 64, to straddle and bend the hooks of the cross chains, whereby the cross chain hooks are bent closed or clenched. The dies 61 slide freely through vertical bores 64' provided in the bar 15, and the dies 61 and plungers 58 are disposed above and movable to and from the lower anvil bar 11.

Each of the cross chains 8 is wound upon a reel 65 and the reels 65 are supported in any suitable manner upon the respective side portion of the table 1, preferably in the manner disclosed in my co-pending application Serial No. 42,517. When the reels 65 are emptied, they may be replaced by filled reels.

The automatic mechanism for operating the devices for severing the continuous chain, bending or clenching the cross chain hooks, and feeding the cross chains, embodies a reciprocatory longitudinal bar 66, preferably constructed of angle-iron, and having its forward end attached to the reciprocatory grip 2, whereby the bar 66 is continually reciprocated during the operation of the machine M. This bar 66 is located at the same side of the guide as the rock shaft 44, and its free or rear end portion is supported for sliding movement upon a grooved roller or wheel 67 engaging the edge of one flange of the bar 66. The roller 67 is pivoted to the upper free end of an arm 68 which has its lower end pivoted to a standard 69 attached to the table 1, and the arm 68 is normally swung forwardly slightly beyond a vertical line so that the weight of the bar 66 is not liable to tilt the arm 68 rearwardly.

Figures 8, 9, 10, 11, 12:
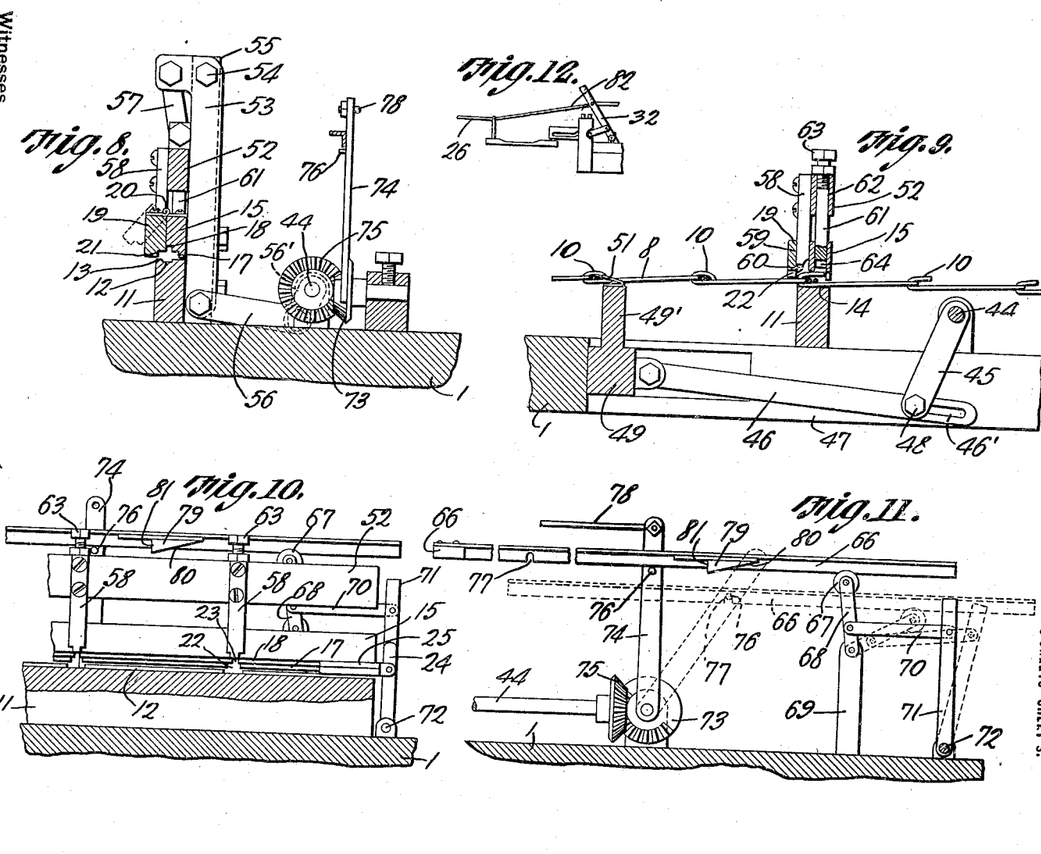
Figs. 8 and 9 are enlarged cross-sectional details taken on the lines 8—8 and 9—9 respectively, of Fig. 1.
Fig. 10 is an enlarged fragmental view of the tail end of the machine.
Fig. 11 is an enlarged fragmental elevation of the automatic mechanism.
Fig. 12 is a fragmental elevation illustrating a modification.

The arm 68 is connected by a rearwardly projecting link 70 to the upstanding arm 71 attached to a transverse rock shaft 72 to which the lever 24 is attached, whereby when the lever 24 is swung, the arm 71 will be swung therewith. When the arm 68 is in normal position, as illustrated in full lines in Fig. 11, the plunger 25 is slid forwardly within the guide, and when the plunger 25 is slid rearwardly by the chain striking thereagainst, the arm 71 is swung rearwardly with the lever 24, and the link 70 pulls the arm 68 rearwardly so that it drops or swings downwardly to the dotted line position illustrated in Fig. 11. This allows the rear end portion of the bar 66 to drop.

When the bar 66 is dropped, the reciprocation thereof is utilized for rotating the rock shaft 44, and to this end a mutilated gear wheel 73 having an upstanding arm 74 meshes with a bevel gear wheel 75 secured to one end of the rock shaft 44. The upstanding arm 74 is arranged to swing longitudinally adjacent the bar 66, and is provided below the bar 66 with an outstanding pin or lug 76. The bar 66 is normally held above the pin 76 by the roller 67 carried by the arm 68, so that the bar 66 cannot engage the pin 76 ordinarily. The depending flange of the bar 66 has a notch 77 which is engageable with the pin 76 when the bar 66 is dropped. The upper end of the arm 74 is connected by a link or rod 79 to the lever 32 of the severing device, whereby when the arm 74 is swung rearwardly, the link 78 will swing the lever 32 correspondingly. The bar 66 carries a laterally offset fixed catch 79 which has a lower inclined face 80 to slide over the upper end of the arm 71 when the bar 66 is dropped, and the catch 79 has a forwardly facing shoulder 81 to drop over and engage the upper end of the arm 71 when the bar 66 is moved forwardly after being dropped.

The operation of the assembling machine is as follows: Let it be assumed that the various parts are in normal position, that is, with the lever 32 swung forwardly as illustrated in Fig. 6, the plunger 25 and arm 68 moved forwardly to support the bar 66 in raised position, and the slide 49 in normal position, the continuous chain 7' turned out or delivered by the machine M will be fed or delivered into the longitudinal passage of the guide or upon the bar 11 of said guide. The continuous chain 7' is fed across the cross chains passing through the grooves 14, and the continuous chain is also moved through the respective hooks 10 of the cross chains within the guide. Now, when a predetermined length of the continuous chain 7' is delivered into the guide so that the end of the chain strikes the plunger 25 and moves the said plunger outwardly or rearwardly, the lever 24 is swung rearwardly, thereby swinging the arm 71 rearwardly. This pulls the link 70 rearwardly, and the arm 68 is swung rearwardly whereby it swings downwardly allowing the reciprocatory bar 66 to drop onto the pin 76. It may again be stated at this point, for purpose of clearness, that the bar 66 although normally reciprocated, is prevented from operating the assembling machine, since the bar 66 is held out of engagement with the pin 76. Now, when the bar 66 is dropped, it rests upon the pin 76, and the rearward movement of the bar 66 brings the notch 77 into engagement with the pin 76, so that the further rearward movement of the bar 66 swings the arm 74 rearwardly. Since the link or rod 78 connects the arm 74 with the lever 32, the lever 32 will be swung rearwardly also, and the severing device is thus operated or moved to the position illustrated in Fig. 7, for severing the continuous chain 7' to provide a longitudinal chain 7 within the guide for assemblage with the cross chains, the operation of the severing device being clear from the above description taken in connection with Figs. 6 and 7. The continuous chain 7' is thus severed as soon as the arm 74 is moved rearwardly. The swinging movement of the arm 74 causes the mutilated gear wheel 73 to turn also, thereby rotating the gear wheel 75 and rock shaft 44 to which it is secured. The rock shaft 44 being rotated will swing the arms 56' to pull the links 56, so as to swing the levers 53 for depressing the bar 52. Although the arms 45 are moved at the same time as the arms 56', the elements 48 of the arms 45 must move to the opposite ends of the slots 46' before the links 46 are moved or pulled with the arms 45, so that sufficient time elapses to allow the bending or clenching means to come into operation before the cross chain feeding device does. The bar 52 being moved downwardly will bring the plungers 48 into engagement with the bends of the respective hooks 10 of the cross chains, to prevent said hooks from being displaced upon the anvil bar 11, while the dies 61 are brought downwardly upon the hooks 10 for bending or clenching them to embrace the longitudinal chain 7 upon the bar 11. During the completion of the clenching of the hooks, the slide 49 is moved toward the bar 11 so that the catches 50 engage the succeeding longitudinal chain 7 which has previously left the bar 11, the catches 50 moving along the cross chains 8. During the rearward movement of the bar 66, the catch 79 thereof snaps over the upper end of the arm 71. Now when the bar 66 is moved forwardly, the arm 74 is swung forwardly due to the engagement of the pin 76 in the notch 77 of the bar 66, and the lever 32 of the severing device is naturally swung forwardly to restore the severing device to normal position as seen in Fig. 6. Furthermore, when the arm 74 is swung forwardly, the rock shaft 44 is rotated for swinging the arms 45 and 56' thereof backwardly toward the bar 11. The arms 56' being swung to normal position will swing the levers 53 for raising the bar 52 and retracting the plungers 58 and dies 61 from off of the cross chains, it being observed that the arms 45 must move backwardly a limited distance until the elements 48 strike the respective ends of the slots 46', before the links 46 are moved. This gives sufficient opportunity for the bar 52 to be raised for retracting the plungers 58 and dies 61 before the feeding device for the cross chains is operated. Therefore, after the bar 52 is raised slightly, and during the completion of the upward movement of the bar 52, the links 46 are moved by the arms 45 to return the slide 49 to normal position, and the catches 50 being engaged to the succeeding or following longitudinal chain 7 will carry said longitudinal chain with the flange 49'. This causes the fabric to be pulled or moved to one side, for pulling the cross chains across the bar 11, and thereby removing the respective links of the cross chains and the last longitudinal chain off of the bar 11, and at the same time moving the new open hooks 10 onto the bar 11 within the longitudinal passage for the longitudinal chain. During the return movement of the bar 66, the shoulder 81 of the catch 79 strikes the upper end of the arm 71, and causes said arm 71 to be swung forwardly for raising the arm 68. This will cause the bar 66 to raise itself, so to speak, since the bar 66 in swinging the arm 71 forwardly will swing the arm 68 forwardly and upwardly to raise the bar 66 to normal position, and at the same time, the lever 24 is swung forwardly with the arm 71 to move the plunger 25 to normal position within the guide. When the arm 68 is swung forwardly beyond a vertical line to hold the bar 66 raised, the bar 66 is also raised off of the pin 76, so that the bar 56 will now reciprocate idly until the continuous chain 7' is again delivered into the guide to actuate the plunger 25.

The operation of the assembling machine is thus entirely automatic, requiring no attention of an operator or attendant, unless something goes wrong, which is liable to happen with any machine. When the cross chains are pulled, the bar 19 of the guide can swing to one side, as illustrated in dotted lines in Fig. 8, to allow the respective cross chain links and the longitudinal chain to move off of the bar 11. Attention is directed to the fact that the severing of the continuous chain, the clenching of the cross chain hooks, and the feeding of the cross chains or fabric is all done during one complete reciprocation of the bar 66, so that it is not necessary, ordinarily, to stop the machine M, since the assembling machine is operated at the proper time and is restored to normal position before the chain delivered by the machine M has an opportunity to be delivered further into the guide of the assembling machine. In other words, one complete reciprocation of the grip 2 and corresponding parts of the machine M completes but a single link of the continuous chain 7', and the bar 66 being reciprocated with the grip 2 and only a portion of the reciprocatory movement of the bar 66 being utilized for operating the assembling machine, enables the assembling machine to operate before a new link of the chain 7' is formed and delivered. Consequently, it is not necessary to stop the delivery of the chain 7' during the operation of the assembling machine, and even though necessary, the feeding of the chain 7' may be readily stopped. This can be accomplished by the means illustrated in Fig. 12, which merely resides in the provision of a link 82 connecting the lever 32 and link or rod 26, so that when the lever 32 is swung rearwardly during the operation of the assembling machine, the rod 26 is moved for swinging the arm 4 and sliding the wedge 28 to render the grip 2 and dog 6 inoperative. In this manner, the feeding rolls, grip 2 and dog 6 of the machine M can be rendered inoperative during the operation of the assembling machine, and as soon as the assembling machine is restored to its normal position, the link 82 is moved forwardly for again allowing the grip 2 and dog 6 to operate.

Having thus described the invention, what is claimed as new is:

1. A chain-fabric assembling machine embodying a guide for receiving a longitudinal chain and coöperable with cross chains having hooks, means for moving said guide and cross chains relative to one another, and automatic means for setting said means in operation when the longitudinal chain is delivered into the guide.

2. A chain-fabric assembling machine embodying a guide for receiving a longitudinal chain and coöperable with cross chains having hooks, means for bending the hooks of the cross chains to embrace the longitudinal chain, and means operated automatically when the longitudinal chain is received by the guide for setting the aforesaid means in operation.

3. A chain-fabric assembling machine embodying a guide for receiving a longitudinal chain and coöperable with cross chains having hooks, means for moving the guide and cross chains relative to one another, means for bending the hooks to embrace the longitudinal chain, and means operated automatically when the longitudinal chain is received by the guide for setting in motion the first and second mentioned means.

4. A chain-fabric assembling machine embodying a guide for receiving a longitudinal chain and coöperable with cross chains having hooks, feeding means for moving the cross chains across the guide, the guide being stationary, and means operated automatically when the longitudinal chain is received by the guide for setting said means in motion.

5. A chain-fabric assembling machine embodying a stationary guide for receiving a longitudinal chain and coöperable with cross chains having hooks, means for bending the hooks of the cross chains to embrace the longitudinal chain, means for feeding the cross chains across the guide, and means operated automatically when a longitudinal chain is received by the guide for setting the first-mentioned and second-mentioned means in motion.

6. A chain-fabric assembling machine embodying a stationary guide for receiving a longitudinal chain and coöperable with cross chains having hooks, means for delivering a longitudinal chain into the guide, and feeding means for moving the cross chains across the guide.

7. A chain-fabric assembling machine embodying a guide for receiving a longitudinal chain and coöperable with cross chains having hooks, means for delivering a longitudinal chain into the guide, feeding means for moving the cross chains across the guide, and means operated automatically when a longitudinal chain is delivered into the guide for setting said feeding means into motion.

8. A chain-fabric assembling machine embodying a stationary guide for receiving a longitudinal chain and coöperable with cross chains having hooks, means for delivering a longitudinal chain into the guide, means coöperable with the guide for bending the hooks of the cross chains to embrace the longitudinal chain, and means for feeding the cross chains across the guide.

9. A chain-fabric assembling machine embodying a stationary guide for receiving a longitudinal chain and coöperable with cross chains having hooks, means for delivering a longitudinal chain into the guide, means coöperable with the guide for bending the hooks of the cross chains to embrace the longitudinal chain, means for feeding the cross chains across the guide, and means operated automatically when a longitudinal chain is delivered into the guide for setting into motion the second and third mentioned means.

10. A chain-fabric assembling machine embodying means for guiding a longitudinal chain across cross chains having hooks and for moving the guiding means and cross chains relative to one another, and means operated automatically when the longitudinal chain is moved across the cross chains for bringing said means into operation for moving the guiding means and cross chains relative to one another.

11. A chain-fabric assembling machine embodying means for guiding a longitudinal chain across cross chains having hooks, means for bending the hooks of the cross chains to embrace the longitudinal chain, and means operated automatically when the longitudinal chain is moved across the cross chains for bringing the second-mentioned means into operation.

12. A chain-fabric assembling machine embodying means for guiding a longitudinal chain across cross chains having hooks and for moving the guiding means and cross chains relative to one another, means for bending the hooks of the cross chains to embrace the longitudinal chain, and means operated automatically when the longitudinal chain is guided across the cross chains for bringing the first and second mentioned means into operation to bend the hooks and move the guiding means and cross chains relative to one another.

13. A chain-fabric assembling machine embodying means for guiding a longitudinal chain across cross chains having hooks, means for moving the cross chains relative to the guiding means, and means operated automatically when the longitudinal chain is guided across the cross chains for setting the second-mentioned means into motion.

14. A chain-fabric assembling machine embodying means for guiding a longitudinal chain across cross chains having hooks, means for bending the hooks of the cross chains to embrace the longitudinal chain, means for moving the cross chains, and means operated automatically when the longitudinal chain is moved across the cross chains for setting the second and third mentioned means into operation.

15. A chain-fabric assembling machine comprising a stationary guide having a longitudinal passage for the reception of a longitudinal chain and having transverse passages for the reception of cross chains having hooks, a reciprocatory member at one side of the guide movable toward and away therefrom, means for delivering the longitudinal chain into the longitudinal passage, means for bending the hooks of the cross chains to embrace the longitudinal chain, and means for actuating said reciprocatory member.

16. A chain-fabric assembling machine comprising a guide having a longitudinal passage for the reception of a longitudinal chain and having transverse passages for the reception of cross chains having hooks, a reciprocatory member at one side of the guide for moving the cross chains through the guide, means for bending the hooks of the cross chains to embrace the longitudinal chain, and means operated automatically when the longitudinal chain is delivered into the guide for operating said bending means and reciprocatory member.

17. A chain-fabric assembling machine embodying means for feeding a continuous chain across a number of cross chains having hooks, means for severing the continuous chain to provide a longitudinal chain for assemblage with the cross chains, means for feeding the cross chains, and means operated automatically when a predetermined length of the longitudinal chain is moved across the cross chains for operating the second and third mentioned means to sever the continuous chain and then feed the cross chains.

18. A chain-fabric assembling machine embodying means for feeding a continuous chain across a number of cross chains having hooks, means for guiding the continuous chain across the cross chains, means for severing the continuous chain to provide a longitudinal chain, means movable relative to the guiding means for feeding the cross chains across the same, and means operated automatically when the longitudinal chain is received by the guiding means for bringing the third and fourth mentioned means into operation.

19. A chain-fabric assembling machine embodying means for delivering a continuous chain across a number of cross chains having hooks, means for severing the continuous chain, means for bending the hooks of the cross chains to embrace the longitudinal chain provided when the continuous chain is severed, and means operated automatically when a predetermined length of the continuous chain is moved across the cross chains for operating the second and third mentioned means.

20. A chain-fabric assembling machine embodying means for delivering a continuous chain across a number of cross chains having hooks, means for guiding the continuous chain across the cross chains, means for severing the continuous chain to provide a longitudinal chain, means coöperable with the guiding means for bending the hooks of the cross chains to embrace the longitudinal chain, means for moving the guiding means and cross chains relative to one another, and means operated automatically when a predetermined length of continuous chain is moved across the cross chains for bringing the third, fourth and fifth mentioned means into operation.

21. A chain-fabric assembling machine, embodying a guide having a longitudinal passage for receiving a longitudinal chain and having transverse passages for the passage of cross chains having hooks, means for delivering a continuous chain into the longitudinal passage, means for severing the continuous chain, means for moving the guide and cross chains relative to one another, and means operated automatically when a predetermined length of continuous chain is received by the guide for operating the second and third mentioned means.

22. A chain-fabric assembling machine, embodying a guide having a longitudinal passage for receiving a longitudinal chain and having transverse passages for the passage of cross chains having hooks, the guide being stationary, means for feeding a continuous chain into the longitudinal passage, means for severing the continuous chain to provide a longitudinal chain within the guide, feeding means for moving the cross chains through the guide, and means operated automatically when a predetermined length of the continuous chain is received by the guide for operating the second and third mentioned means.

23. A chain-fabric assembling machine embodying a guide having a longitudinal passage for receiving a longitudinal chain and transverse passages for the passage of cross chains having hooks, means for delivering a continuous chain into the longitudinal passage, means for severing the continuous chain to provide a longitudinal chain within the guide, means for bending the hooks of the cross chains to embrace the longitudinal chain, and means operated automatically when a predetermined length of the continuous chain is received by the guide for operating the second and third mentioned means.

24. A chain-fabric assembling machine embodying a guide having a longitudinal passage for receiving a longitudinal chain and transverse passages for the passage of cross chains having hooks, means for delivering a continuous chain into the longitudinal passage, means for severing the continuous chain to provide a longitudinal chain within the guide, means for bending the hooks of the cross chains to embrace the longitudinal chain, means for feeding the cross chains through the guide, and means operated automatically when a predetermined length of the continuous chain is received by the guide for operating the second, third and fourth mentioned means.

25. A chain-fabric assembling machine, embodying a guide for receiving a longitudinal chain and coöperable with cross chains having hooks, means for bending the hooks of the cross chains to embrace the longitudinal chain, means for feeding the cross chains across the guide, operating means, and means for connecting the operating means and second and third mentioned means when the longitudinal chain is received by the guide.

26. A chain-fabric assembling machine embodying a guide for receiving a longitudinal chain and coöperable with cross chains having hooks, means for delivering a continuing chain into the guide, means for severous chain to provide a longitudinal chain in the guide, means for bending the hooks of the cross chains to embrace the longitudinal chain, means for feeding the cross chains across the guide, an operating means, and means for connecting said operating means with the second, third and fourth mentioned means when a predetermined length of the continuous chain is received by the guide.

27. A chain-fabric assembling machine embodying a guide for receiving a longitudinal chain and coöperable with cross chains having hooks, means for bending the hooks of the cross chains to embrace the longitudinal chain, means for feeding the cross chains across the guide, continually operable means adapted to actuate the first and second mentioned means, and means for normally disconnecting the operating means from the first and second mentioned means and operable when the longitudinal chain is received by the guide to connect the operating means with the first and second mentioned means.

28. A chain-fabric assembling machine embodying a guide for receiving a longitudinal chain and coöperable with cross chains having hooks, means for delivering a continuous chain into the guide, means for severing the continuous chain to provide a longitudinal chain in the guide, means for bending the hooks of the cross chains to embrace the longitudinal chain, means for feeding the cross chains across the guide, continually operating means adapted to operate the second, third and fourth mentioned means, and means for normally disconnecting the operating means for the second, third and fourth mentioned means and operable when a predetermined length of continuous chain is received by the guide for connecting the operating means with the second, third and fourth mentioned means.

29. A chain-fabric assembling machine embodying a guide for receiving a longitudinal chain and coöperable with cross chains having hooks, means for bending the hooks to embrace the longitudinal chain, means for feeding the cross chains across the guide, reciprocatory operating means, means adapted to be operated by the operating means for actuating the first and second mentioned means, and means for normally disconnecting the third and fourth mentioned means and adapted to connect them when the longitudinal chain is received by the guide.

30. A chain-fabric assembling machine embodying a guide for receiving a longitudinal chain and coöperable with cross chains having hooks, means for delivering a continuous chain into the guide, means for severing the continuous chain to provide a longitudinal chain within the guide, means for bending the hooks of the cross chain to embrace the longitudinal chain, means for feeding the cross chains across the guide, a reciprocatory operating means, means adapted to be actuated by the operating means and connected to the second, third and fourth mentioned means for operating them, and means for normally disconnecting the fifth and sixth mentioned means for connecting them when a predetermined length of the continuous chain is received by the guide.

31. A chain-fabric assembling machine embodying a guide for receiving a longitudinal chain coöperable with cross chains having hooks, means for bending the hooks to embrace the longitudinal chain, means for feeding the cross chains across the guide, an arm operatively connected to said means for operating them, the arm projecting upwardly and having an outstanding pin, a reciprocatory bar above said pin and having a notch engageable therewith, an upwardly projected pivoted arm having means at its upper end engaging and normally supporting the bar above said pin, an arm linked to the second mentioned arm, means operatively connected to the third mentioned arm and coöperable with the guide whereby when the longitudinal chain is received by the guide the third mentioned arm is swung to swing the second mentioned arm downwardly, and a member carried by the bar and movable over the upper end of the third mentioned arm to engage the third mentioned arm and swing the same backwardly to raise the second mentioned arm when the bar is returned.

32. In a machine of the character described, a guide having a longitudinal passage for the reception of a longitudinal chain and transverse passages for the passage of cross chains having hooks, means for moving the hooks of the cross chains into place against the longitudinal chain, and means for bending said hooks to embrace the longitudinal chain.

33. In a machine of the character described, a guide having a longitudinal passage for the reception of a longitudinal chain and transverse passages for the passage of cross chains having hooks, and a reciprocatory member above the guide and having downwardly projecting dies adapted to bend the hooks of the cross chains to embrace the longitudinal chain, and having downwardly projecting plungers so formed as to move the cross chain hooks into place against the longitudinal chain and to hold the hooks against displacement while being bent.

In testimony that I claim the foregoing as my own, I have hereto affixed my signature in the presence of two witnesses.

GARY B. SMITH.

Witnesses:
IVY E. SIMPSON,
RUTH SCOTT.

Copies of this patent may be obtained for five cents each, by addressing the "Commissioner of Patents, Washington, D. C."